United States Patent [19]

Hayashi et al.

[11] Patent Number: 4,951,469

[45] Date of Patent: Aug. 28, 1990

[54] HYDROSTATIC CONTINUOUSLY VARIABLE TRANSMISSION

[75] Inventors: Tsutomu Hayashi, Tokyo; Goroei Wakatsuki; Kiyoshi Katahira, both of Saitama, all of Japan

[73] Assignee: Honda Giken Kogyo Kabushiki Kaisha, Tokyo, Japan

[21] Appl. No.: 245,867

[22] Filed: Sep. 16, 1988

[30] Foreign Application Priority Data

Sep. 21, 1987 [JP] Japan .................. 62-236600
Aug. 22, 1988 [JP] Japan .................. 63-207832

[51] Int. Cl.$^5$ ............................. F16D 39/00
[52] U.S. Cl. ........................... 60/489; 60/487; 91/480
[58] Field of Search ............ 91/480; 60/487, 489

[56] References Cited

U.S. PATENT DOCUMENTS

| | | | |
|---|---|---|---|
| 1,274,391 | 8/1918 | Davis | 60/489 |
| 2,360,025 | 10/1944 | Wahlmark | 60/433 |
| 2,395,980 | 3/1946 | Wahlmark | 67/389 |
| 2,683,421 | 7/1954 | Woydt | 91/481 |
| 2,844,002 | 7/1958 | Pavesi | 91/480 |
| 3,075,472 | 1/1963 | Garnier | 91/506 |
| 3,187,868 | 6/1965 | Gantzer | 192/101 |
| 3,313,108 | 4/1967 | Allgaier et al. | 60/464 |
| 3,620,130 | 11/1971 | Roberts | 91/506 |
| 3,735,646 | 5/1973 | Roberts | 74/687 |
| 4,444,093 | 4/1984 | Koga et al. | 94/488 |
| 4,646,520 | 3/1987 | Furumoto et al. | 60/487 |
| 4,741,251 | 5/1988 | Hayashi et al. | 91/506 |
| 4,748,898 | 6/1988 | Hayashi et al. | 92/12.2 |
| 4,827,721 | 5/1989 | Hayashi et al. | 60/487 |

FOREIGN PATENT DOCUMENTS

| | | |
|---|---|---|
| 0243004 | 10/1987 | European Pat. Off. |
| 791714 | of 1935 | France |
| 57-70968 | 5/1982 | Japan |
| 61-28902 | 11/1985 | Japan |
| 62-4963 | 1/1987 | Japan |

Primary Examiner—Edward K. Look
Assistant Examiner—John E. Ryznic
Attorney, Agent, or Firm—Lyon & Lyon

[57] ABSTRACT

A hydrostatic continuously variable transmission comprising a hydraulic pump having a pump cylinder, a hydraulic motor having a motor cylinder and a hydraulic closed circuit between the pump and motor, wherein the pump cylinder and motor cylinder are connected integrally rotatably to form a transmission member, one of input and output sections of the transmission being formed on the outer periphery of one of the cylinders and the other of the sections being formed by a transmission shaft which relatively rotatably carries the cylinders. The hydraulic closed circuit includes groups of first and second distributor valves for controlling transfer of working oil between the pump and motor through oil passages and first and second valve driving means for driving these groups of valves are arranged such that one is inside and the other is outside of a cylinder block formed of the pump and motor cylinders. This allows a transmission to have a compact size and a high industrial utility.

18 Claims, 18 Drawing Sheets

FIG.12
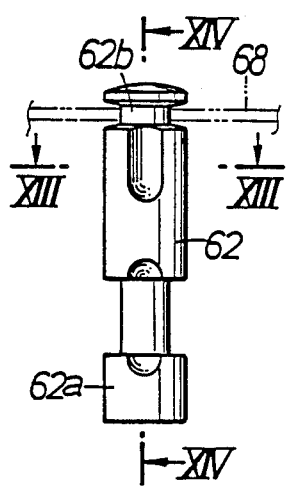
FIG.11
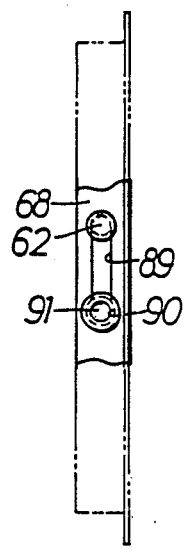
FIG.13  FIG.14
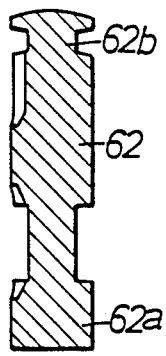

HYDROSTATIC CONTINUOUSLY VARIABLE TRANSMISSION

BACKGROUND OF THE INVENTION

1. Field of the Invention

The present invention relates to a hydrostatic continuously variable transmission having a hydraulic pump and a hydraulic motor which are associated with each other via a hydraulic closed circuit.

2. Description of the Prior Art

A hydrostatic continuously variable transmission of this kind has already been known and it has been disclosed in Japanese utility model publication Kokoku No. 28902/86, for example.

Conventionally known hydrostatic continuously variable transmissions of this type use an input shaft arranged at the central portion thereof and a hydraulic pump driven by this input shaft is related at its outer periphery to a hydraulic motor concentrically disposed around the pump. This arrangement inevitably causes the motor cylinder of the hydraulic motor to have a large diameter and therefore it is not possible to provide on the outer periphery of the motor cylinder an output gear of such a relatively small diameter as would be suitable for driving a loading member at a reduced speed. Since in this arrangement an output shaft is continuously extended from the motor cylinder to an axial side of the hydraulic pump, the structure is complicated.

Furthermore, the present assignee has already proposed in Japanese patent publication Kokai No. 4963/87 a hydrostatic continuously variable transmission which is constructed to reliably deliver working oil between a hydraulic pump and a hydraulic motor and accordingly have a high transmission efficiency, wherein a pump cylinder of the hydraulic pump and a motor cylinder of the hydraulic motor are connected together to form a cylinder block, an annular inner oil passage and an annular outer oil passage surrounding the inner oil passage are formed between a number of annularly arranged cylinder bores of the pump cylinder and a number of annularly arranged cylinder bores of the motor cylinder, a number of first distributor valves and a number of second distributor valves are disposed in a radial arrangement, respectively, between the pump cylinder bores and the motor cylinder bores so as to reciprocally move between radially inner and outer positions for providing alternate connection of the number of pump cylinder bores with the inner and outer oil passages and alternate connection of the number of motor cylinder bores with those passages, respectively. Outer ends of the first distributor valves are engaged by a first eccentric ring and are thereby given reciprocating motion in response to relative rotation between the cylinder block and an input member of the hydraulic pump. Outer ends of the second distributor valves are similarly engaged by a second eccentric ring and are thereby given reciprocating motion in response to rotation of the cylinder block. The cylinder bores of the pump cylinder are each placed in communication with one of the oil passages in a discharge stroke and with the other oil passage in a suction stroke whereas the cylinder bores of the motor cylinder are each communicated with said one oil passage in an expansion stroke and with said other oil passage in a shrinkage stroke.

In the case of a hydrostatic continuously variable transmission as constructed above, however, the first and second eccentric rings for driving the first and second distributor valves are to be concentrated around the outer periphery of the cylinder block, as a result of which the dimension of the cylinder block becomes large in the radial direction. This may be an obstruction to obtaining a compact transmission.

SUMMARY OF THE INVENTION

The present invention has been proposed in view of the above circumstances and its first object is to provide a hydrostatic continuously variable transmission having a simple and effective structure which would permit one of input and output sections to have a relatively small diameter and to be located on the outer periphery of the motor cylinder or pump cylinder.

A second object of the invention is to provide a hydrostatic continuously variable transmission which is compact and has a high power transmission efficiency.

In order to achieve the first object, according to the invention, there is provided a hydrostatic continuously variable transmission comprising a hydraulic pump having a pump cylinder, a hydraulic motor having a motor cylinder, a hydraulic closed circuit between the hydraulic pump and the hydraulic motor, and a transmission shaft which relatively rotatably supports thereon the pump cylinder and the motor cylinder, wherein a pump swashplate is opposedly arranged at an outer end of the pump cylinder, a motor swashplate is opposedly arranged at an outer end of the motor cylinder, said pump cylinder and said motor cylinder being integrally rotatably connected with each other so as to form a transmission member, one of said pump swashplate and said motor swashplate being formed to be driven synchronously with the transmission shaft, and wherein said transmission shaft is formed as one of an input section and an output section of the continuously variable transmission while the other of the input and output sections is formed on an outer periphery of one of the pump cylinder and the motor cylinder.

With the above arrangement, the input section or output section formed on the outer periphery of one of the pump cylinder and the motor cylinder can be made of a relatively small diameter without being disturbed by the other of the cylinders. When an output section is formed on such cylinder for the purpose of driving a loading member, for example, a drive at a reduced speed is achieved with a simple structure.

In order to achieve the second object, according to the invention, there is provided a hydrostatic continuously variable transmission comprising a hydraulic pump having a pump cylinder, a hydraulic motor having a motor cylinder, and a hydraulic closed circuit between the hydraulic pump and the hydraulic motor, the pump cylinder and the motor cylinder being connected together to form a cylinder block, wherein said hydraulic closed circuit comprises a number of pump cylinder bores arranged annularly in the cylinder block, a number of motor cylinder bores arranged annularly in the cylinder block, an annular inner oil passage and an annular outer oil passage disposed between the pump cylinder bores and the motor cylinder bores, the outer oil passage surrounding the inner oil passage, a number of radially arranged first distributor valves capable of reciprocally moving between radially inner and outer positions of the cylinder block to alternately communicate the respective pump cylinder bores with the inner and outer oil passages, and a number of radially arranged second distributor valves capable of reciprocally moving between radially inner and outer positions of the cylinder block to alternately communicate the respective motor cylinder bores with the inner and outer oil passages, wherein a first valve driving means is provided for driving the first distributor valves and a second valve driving means is provided for driving the second distributor valves, one of the first and second valve driving means being arranged inside the cylinder block and the other being arranged outside the cylinder block.

The above arrangement serves to avoid a concentrated disposition of the first and second valve driving means, thereby enabling the transmission to be made compact and increasing the freedom in design of respective valve driving means.

Objects, features and advantages of the invention other than the above will be apparent from reading the following detailed description of preferred embodiments with reference to the accompanying drawings.

BRIEF DESCRIPTION OF THE DRAWINGS

The attached drawings show embodiments according to the invention.

FIGS. 1 to 17 illustrate a first embodiment, wherein

FIG. 1 is a plan view in longitudinal section of a hydrostatic continuously variable transmission;

FIG. 2 is a rear view in longitudinal section, similar to FIG. 1;

FIGS. 3, 4 and 5 are sectional views taken along lines III—III, IV—IV and V—V in FIG. 2, respectively;

FIG. 6 is a sectional view taken along a line VI—VI in FIG. 1;

FIG. 7 is a sectional view taken along a line VII—VII in FIG. 6;

FIG. 8 is a sectional view taken along a line VIII—VIII in FIG. 1;

FIG. 9 is a sectional view (in a clutch ON condition) taken along a line IX—IX in FIG. 1;

FIG. 10 is an operation view (in a clutch OFF condition), similar to FIG. 9;

FIG. 11 is a view taken in a direction indicated by an arrow XI in FIG. 9;

FIG. 12 is a front view of the second distributor valve;

FIGS. 13 and 14 are sectional views taken along lines XIII—XIII and XIV—XIV in FIG. 12, respectively;

FIG. 15 is a sectional view taken along a line XV—XV in FIG. 2; and

FIG. 16 is a view taken in a direction indicated by an arrow XVI in FIG. 2; and

FIG. 17 is a rear view in longitudinal section of an essential part of a power unit of an automobile equipped with said transmission.

FIGS. 18-22 illustrate a second embodiment, wherein

FIG. 18 is a plan view in longitudinal section of a hydrostatic continuously variable transmission of this embodiment;

FIG. 19 is a rear view in longitudinal section, similar to FIG. 18;

FIGS. 20 and 21 are sectional views taken along lines XX—XX and XXI—XXI in FIG. 18; and FIG. 22 is a rear view in longitudinal section of an essential part of a power unit of an automobile equipped with the transmission.

DESCRIPTION OF THE PREFERRED EMBODIMENTS

Figure 1:
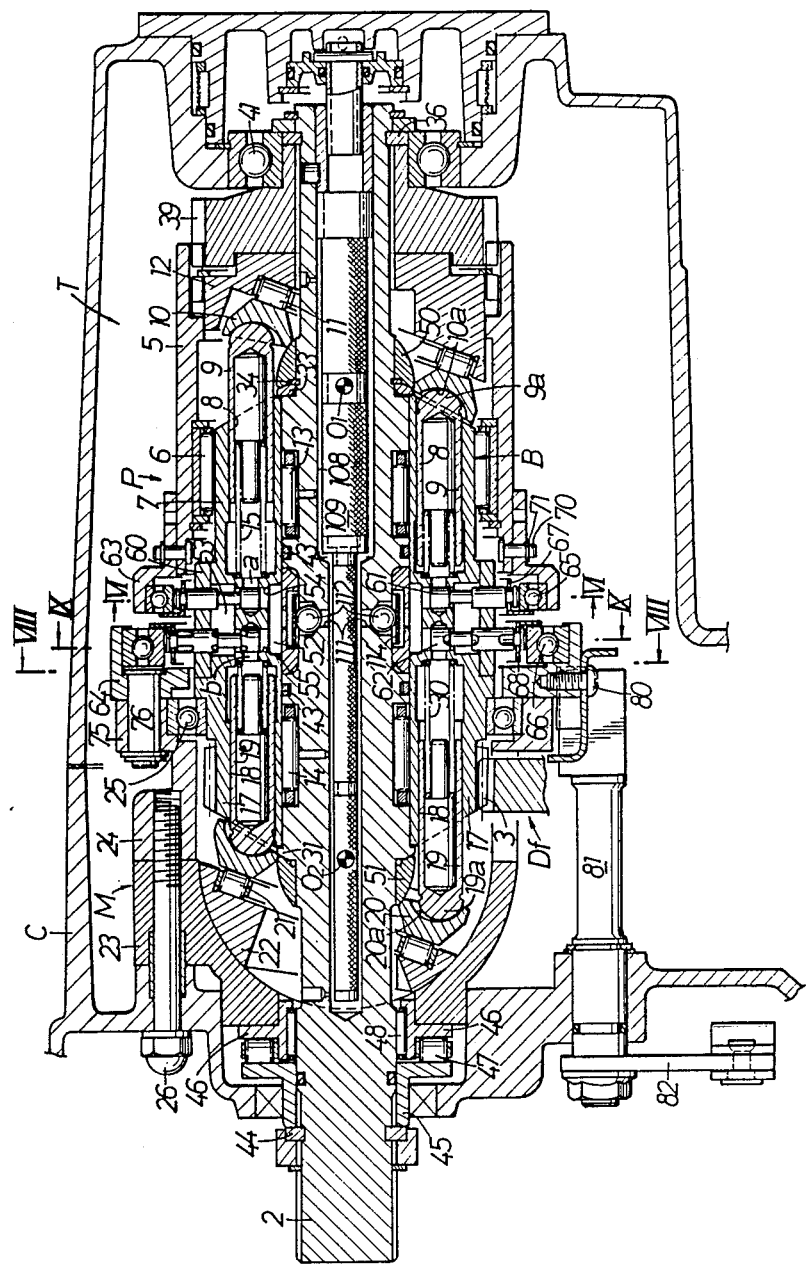

Hereinafter some preferred embodiments according to the invention will be described with reference to the accompanying drawings. Throughout these descriptions of the embodiments corresponding parts and elements are indicated by the same reference numerals and characters.

FIGS. 1-17 show a first embodiment. Referring first to FIG. 17, the reference character U designates a power unit of an automobile, which is formed by accommodating into a casing C and supporting thereon an engine E, a hydrostatic continuously variable transmission T according to a preferred form of the present invention, and a differential device Df.

The engine E has a crankshaft 1 and the continuously variable transmission T has an input shaft 2 as a transmission shaft which is disposed coaxially with respect to the crankshaft 1 at the right-hand end of the latter. These shafts 1 and 2 are connected to each other via a torque damper D. The continuously variable transmission T further has an output gear 3 as an output section of a transmission member, which gear is disposed at a position as close as possible to the engine E and is in mesh with a ring gear of the differential device Df. The differential device Df has left and right drive shafts 4 and 4' arranged parallel with the crankshaft 1 and input shaft 2 and adapted to drive left and right wheel axles not shown.

Figure 2:
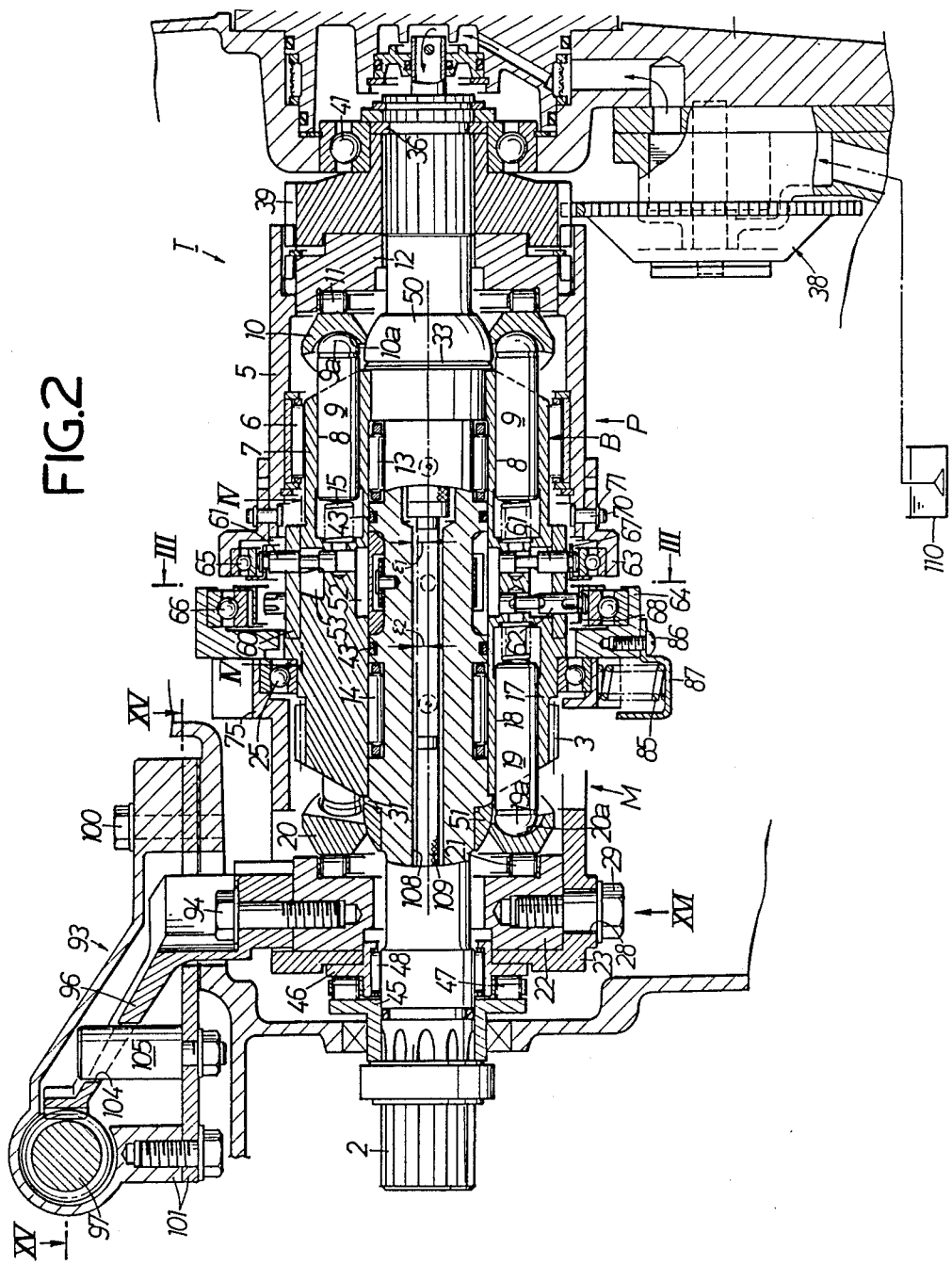
Figure 3:
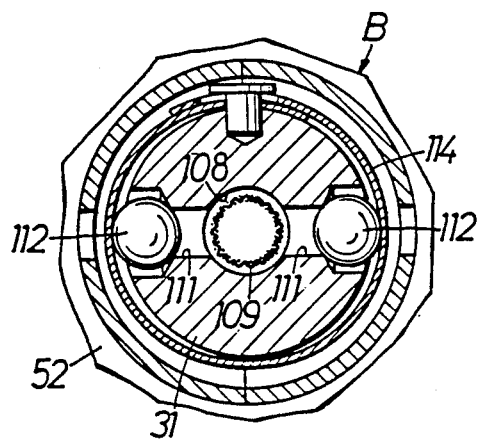

Referring to FIGS. 1 and 2, the continuously variable transmission T comprises a constant capacity or displacement swashplate type hydraulic pump P disposed around the input shaft 2 and a variable capacity or displacement swashplate type hydraulic motor M disposed around the input shaft 2 at a position leftwardly of the pump P.

The hydraulic pump P comprises a cylindrical input shaft 5 to which the input shaft 2 is connected via a drive gear 39, a pump cylinder 7 relatively rotatably fitted to an axially intermediate inner peripheral wall of the cylindrical input shaft 5 through a needle bearing 6, a large number of pump plungers 9, 9 . . . slidably received in a plurality and odd-number of cylinder bores 8, 8 . . . which are provided annularly in the pump cylinder 7 so as to surround the center of rotation of the cylinder, a pump swashplate 10 abutting against outer ends of the pump plungers 9, 9 . . . , and a pump swashplate holder 12 for supporting the back surface of the swashplate 10 through a thrust roller bearing 11 so as to hold the swashplate 10 in an attitude inclined a certain angle relative to the axis of pump cylinder 7 about a phantom trunnion axis $O_1$ which extends normal to the axis of pump cylinder 7. The drive gear 39 is spline-connected to the input shaft 2 and the pump swashplate holder 12 is spline-connected to the inner peripheral wall of the cylindrical input shaft 5. The pump cylinder 7 is relatively rotatably supported on the input shaft 2, which penetrates centrally therethrough, via a needle bearing 13.

The pump swashplate 10 enables the pump plungers 9, 9 . . . to be reciprocally moved during rotation of the shaft 5 to repeat suction and discharge strokes.

The drive gear 39 has a boss which is rotatably supported on the casing C via a ball bearing 41 and the gear 39 is prevented from movement in the axially outward direction by a split cotter 36 retained to the outer peripheral surface of the input shaft 2.

It is to be noted that a coiled spring 15 for biasing each pump plunger 9 in a projecting direction is mounted in compression in the cylinder bore 8 in order to improve the ability of the pump plunger to follow the pump swashplate 10.

On the other hand, the hydraulic motor M comprises a motor cylinder 17 disposed coaxially and leftward with respect to the pump cylinder 7, a large number of motor plungers 19, 19 . . . slidably received in a plurality and odd-number of cylinder bores 18, 18 . . . which are provided annularly in the motor cylinder 17 so as to surround the center of rotation of the latter, a motor swashplate 20 abutting against outer ends of the motor plungers 19, 19 . . . , a trunnion shaft 22 of a semicircular section supporting on its flat surface the back surface of the motor swashplate 20 through a thrust roller bearing 21, and a swashplate anchor 23 for rotatably supporting a cylindrical surface of the trunnion shaft 22. The swashplate anchor 23 as well as a cylindrical cylinder holder 24 connected to the right end of the swashplate anchor 23 are secured to the casing C by a bolt 26.

The cylinder holder 24 supports the motor cylinder 17 rotatably through a needle bearing 25. The motor cylinder 17 is also relatively rotatably supported on the input shaft 2, which penetrates centrally therethrough, via a needle bearing 14.

The afore-mentioned output gear 3 is formed integrally with the motor cylinder 17 at the left end on the outer peripheral surface of the motor cylinder 17.

Figure 16:
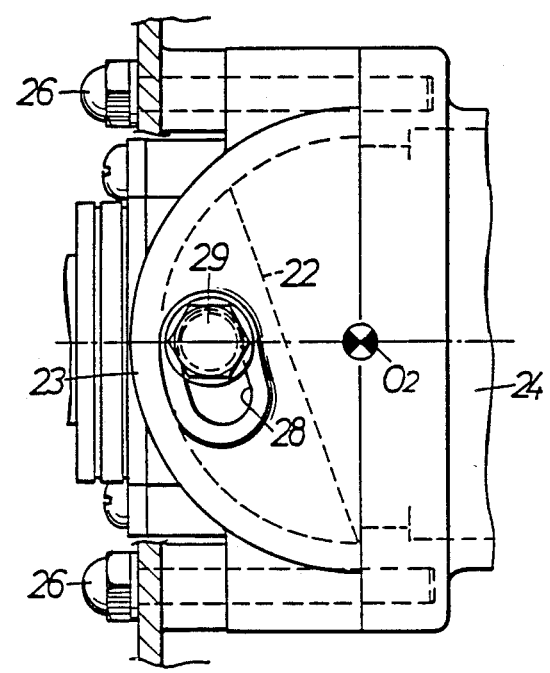
Figure 17:
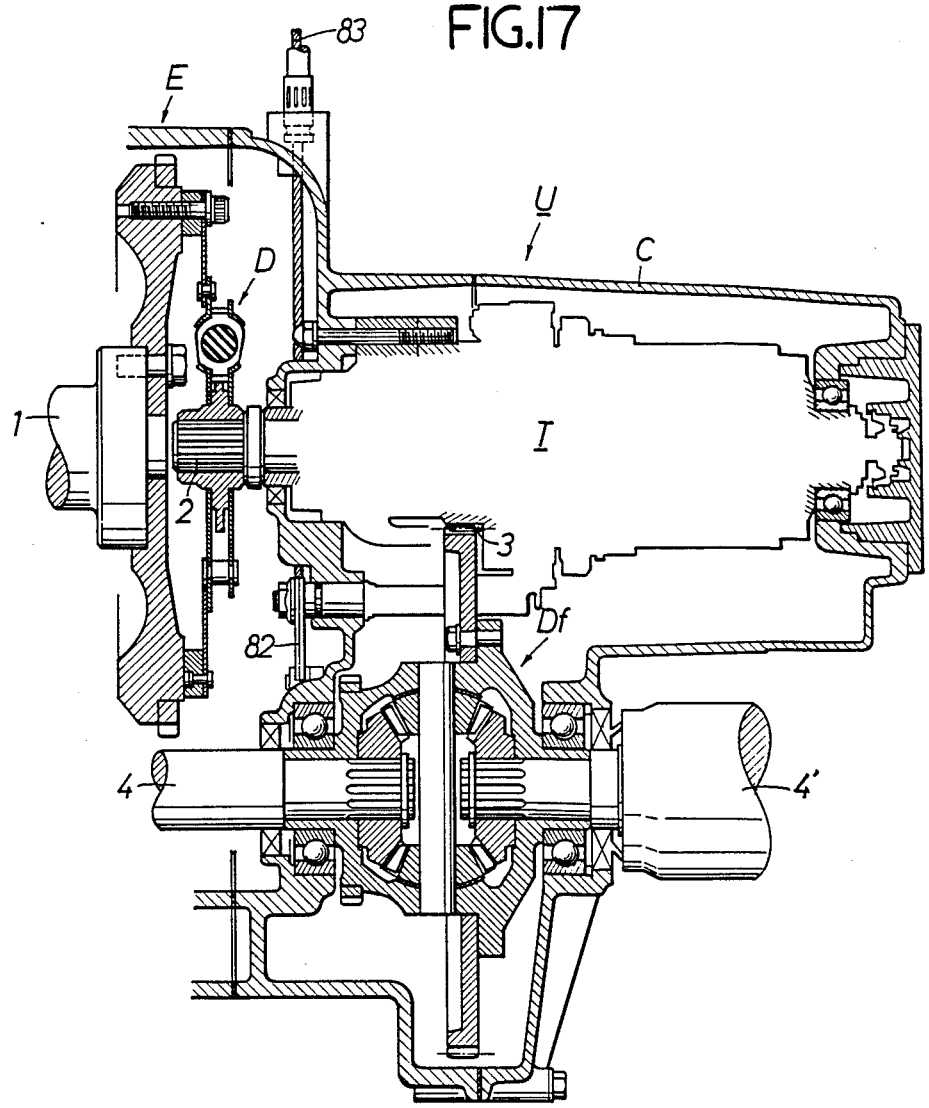
Figure 18:
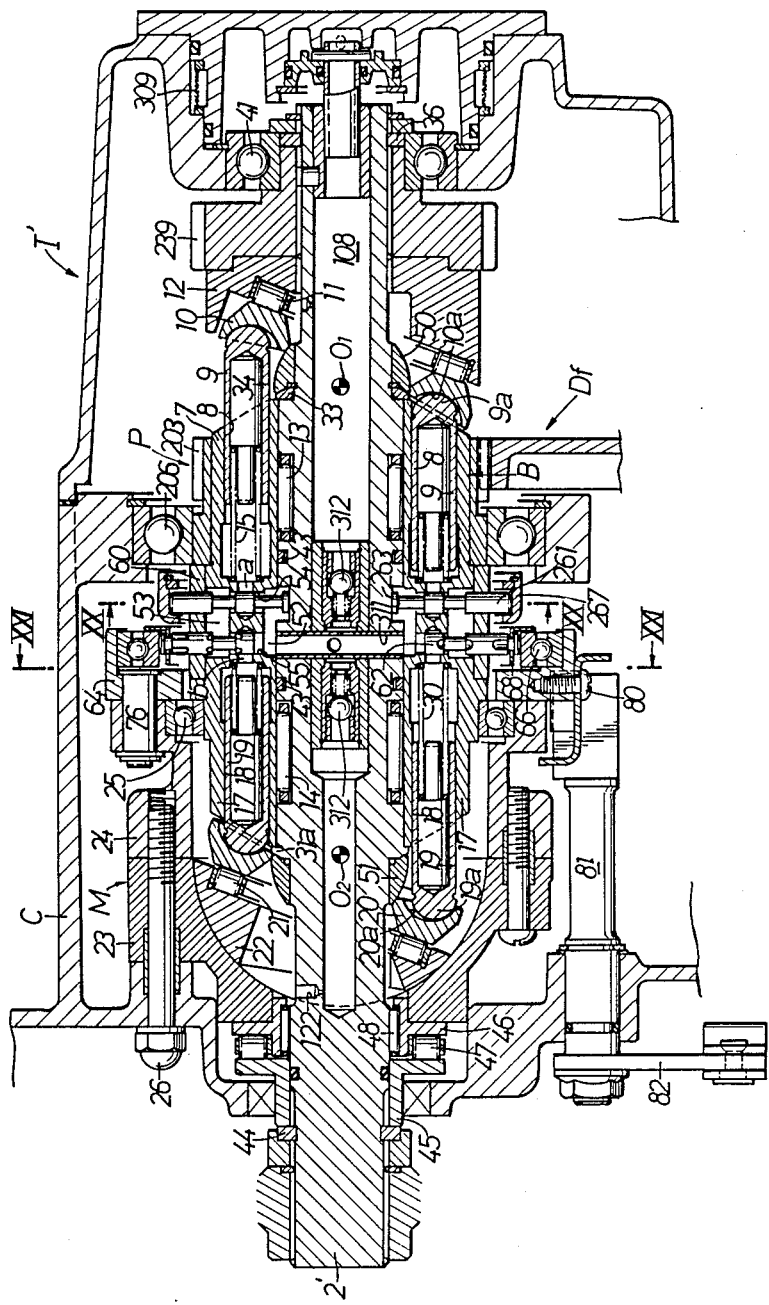
Figure 19:
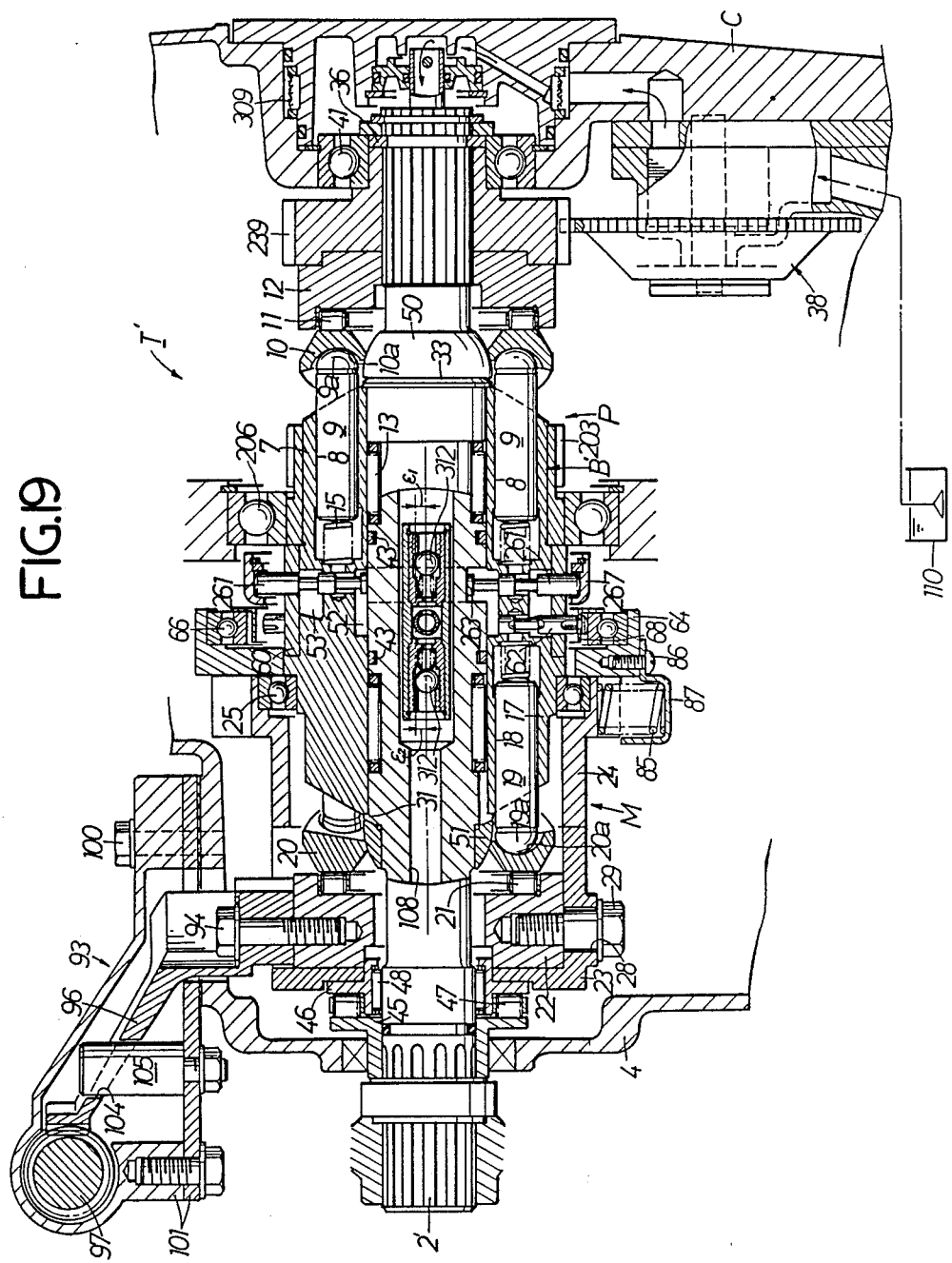

In order to permit the rotation of the trunnion shaft 22 through a predetermined angle while preventing its axial movement, a bolt 29 is secured to one end face of the trunnion shaft 22 through a circular arc-shaped elongated hole 28 bored in the swashplate anchor 23 and having its center located on the axis $O_2$ of the trunnion shaft 22 (see FIGS. 2 and 16).

The motor swashplate 20 is operable by rotation of the trunnion shaft 22 between a standing position in which it is located perpendicularly to the axis of the motor cylinder 17 and a maximum tilted position in which it is tilted down a certain angle. In a tilted position, the motor swashplate 20 enables the motor plungers 19, 19 . . . to be reciprocally moved in response to the rotation of the motor cylinder 17 to repeat expansion and shrinkage strokes.

It should be noted that a coiled spring 30 for biasing each motor plunger 19 in a projecting direction is mounted in compression in the cylinder bore 18 in order to improve the ability of the motor plunger 19 to follow the motor swashplate 20.

The pump cylinder 7 and the motor cylinder 17 constitute an integral cylinder block B so as to be integral in their direction of rotation. The cylinder block B is interposed between a flange 31 projected on the outer periphery of the input shaft 2 and a seat plate 33 retained to the outer periphery of the shaft 2 and thus is held against axial movement. The surfaces of the flange 31 and seat plate 33 have been treated appropriately in order to make smooth relative rotation between the input shaft 2 and the cylinder block B.

The left end of the input shaft 2 extends through the motor swashplate 20, trunnion shaft 22 and the swashplate anchor 23. A retainer 46 and a thrust roller bearing 47 are interposed in order from the side of the swashplate anchor 23 between the anchor 23 and a support sleeve 45 which is spline-connected to the outer periphery of the left end of the shaft 2 and which is secured thereto by a split cotter 44. The input shaft 2 is also rotatably supported at its left end on the swashplate anchor 23 through a needle bearing 48 and the retainer 46.

Slidably fitted over the input shaft 2 are a semispherical aligning member 50 adapted to engage the inner peripheral surface of the pump swashplate 10 for relative tilting movement in all directions and a semispherical aligning member 51 adapted to engage the inner peripheral surface of the motor swashplate 20 for relative tilting movement in all directions. These aligning members provide an aligning effect on the pump swashplate 10 and the motor swashplate 20, respectively.

For the purpose of enhancing the aligning effect on each of the swashplates 10 and 20 and also preventing slip in the rotational direction between the pump swashplate 10 and the pump plungers 9, 9 . . . and between the motor swashplate 20 and the motor plungers 19, 19 . . . , spherical recesses 10a and 20a are defined on the swashplates 10 and 20, respectively, so as to be engaged by spherical ends 9a and 19a of the corresponding plungers 9 and 19.

A hydraulic closed circuit is formed between the hydraulic pump P and the hydraulic motor M in the following manner.

At positions between the cylinder bores 8, 8 . . . of the pump cylinder 7 and the motor cylinder bores 18, 18 . . . of the motor cylinder 17, the cylinder block B is provided with annular inner and outer oil passages 52 and 53, respectively, which are concentrically arranged around the input shaft 2; first valve bores 54, 54 . . . and second valve bores 55, 55 . . . radially penetrating an annular partition wall disposed between both the oil passages 52 and 53 and an outer peripheral wall of the outer oil passage 53, these bores being provided in the same number respectively as the cylinder bores 8, 8 . . . and 18, 18 . . . ; a large number of pump ports a, a . . . permitting the intercommunication of the cylinder bores 8, 8 . . . and adjacent first valve bores 54, 54 . . . ; and a large number of motor ports b, b . . . permitting the intercommunication of the cylinder bores 18, 18 . . . and adjacent second valve bores 55, 55 . . .

The inner oil passage 52 is defined in the form of an annular groove between the opposed peripheral surfaces of the cylinder block B and input shaft 2. In order to prevent oil leakage from the inner oil passage 52, a pair of seal rings 43, 43 capable of rotatably sliding are interposed between the input shaft 2 and cylinder block B on left and right sides of the passage 52.

Figure 4:
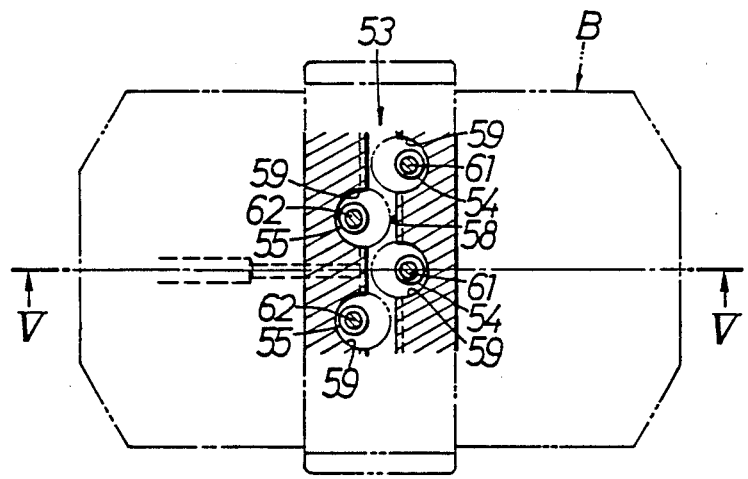
Figure 5:
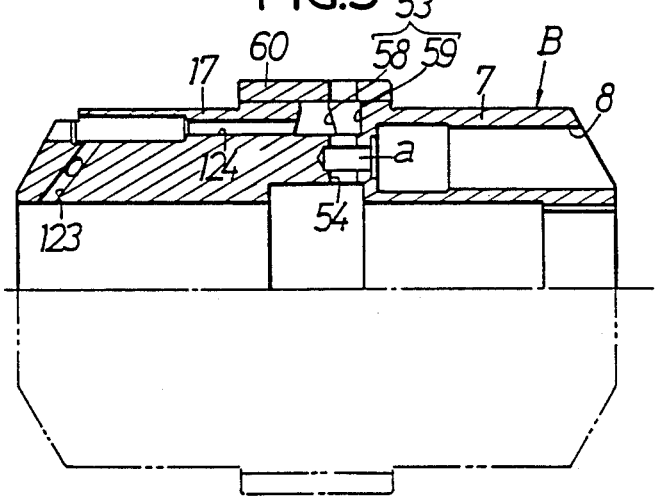

On the other hand, the outer oil passage 53 is formed, as shown in FIGS. 4 and 5, of a pigeon's tail-shaped annular groove 58 cut in the outer periphery of the cylinder block B and a plurality of semicircular recesses 59, 59 . . . made in a zigzag arrangement in opposite side walls of the pigeon's tail-shaped groove 58, with open surfaces of the pigeon's tail-shaped groove 58 and the recesses 59, 59 . . . being closed by a sleeve 60 which is welded to the outer peripheral surface of the cylinder block B. The outer oil passage 53 of such configuration is convenient in decreasing the volume of the high pressure portion to the utmost.

The first and second valve bores 54 and 55 are arranged to penetrate bottom walls of the recesses 59, 59 . . . of such zigzag arrangement, and in correspondence to this, the cylinder bores 8, 8 ... of the hydraulic pump P and the cylinder bores 18, 18 ... of the hydraulic motor M are circumferentially offset in phases from each other.

By such an arrangement it is possible to decrease the distance between the first and second valve bores 54 and 55 in the axial direction of the cylinder block B, while increasing the wall thickness of the cylinder block B between the first and second valve bores 54 and 55. This contributes to a reduced size of the cylinder block B.

In addition, even if an enlarged deformation occurs in the opposite side walls of the pigeon's tail-shaped groove 58 upon introduction of a high hydraulic pressure into the outer oil passage 53, the surface pressure at the fitted portion between the cylinder block B and the sleeve 60 may rather increase due to such deformation, making it possible to prevent oil leakage from such fitted portion.

Spool type first distributor valves 61, 61 ... are slidably received in the first valve bores 54, 54 ..., and spool type second distributor valves 62, 62 ... are slidably received in the second valve bores 55, 55 ..., respectively. A first eccentric ring 63 as a first valve driving means surrounds and engages outer ends of the first distributor valves 61, 61 ... through a ball bearing 65, while a second eccentric ring 64 as a second valve driving means surrounds and engages outer ends of the second distributor valves 62, 62 ... through a ball bearing 66. In order to force these engagements, the first distributor valves 61, 61 ... are interconnected at their outer ends by a first forcing ring 67 concentric with the first eccentric ring 63, while the second distributor valves 62, 62 ... are interconnected at their outer ends by a second forcing ring 68 concentric with the second eccentric ring 64. These connected arrangements will be described below.

Figure 6:
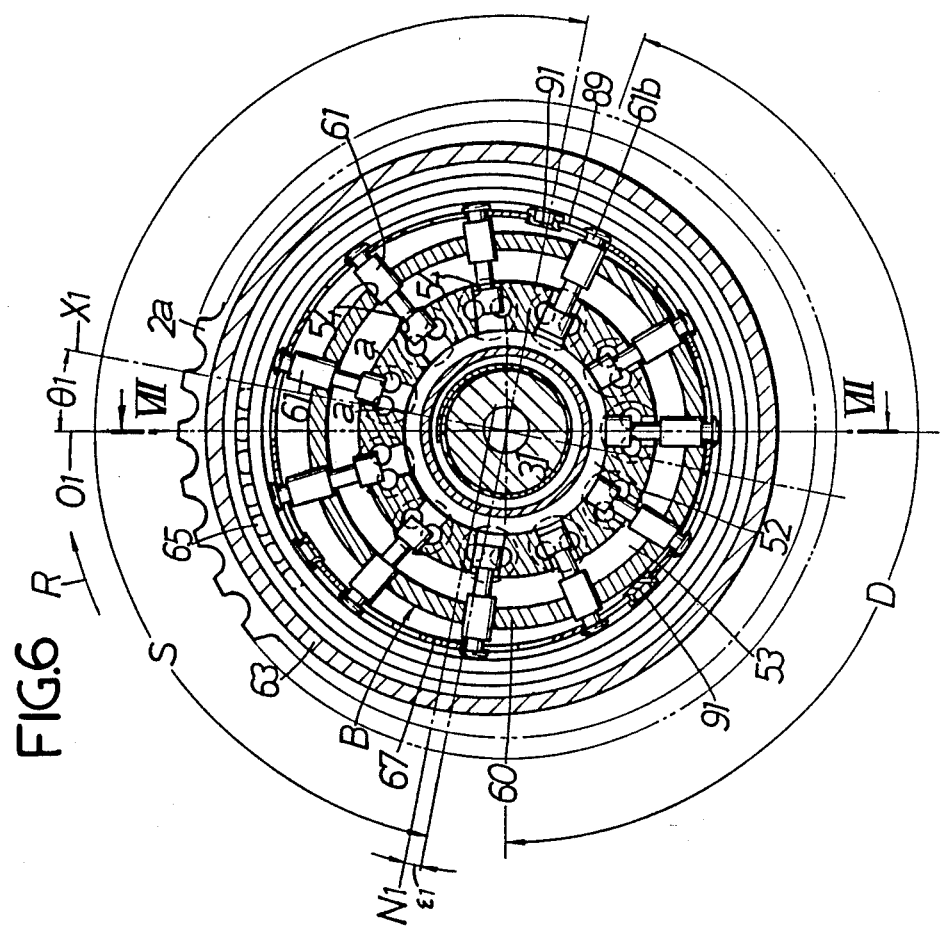

The first eccentric ring 63 is secured to the outer periphery of the cylindrical input shaft 5 and is held at a location eccentrically displaced a given distance $\epsilon_1$ from the center of the input shaft 2 along a line $X_1$ in an eccentric direction, as shown in FIG. 6. The line $X_1$ in the eccentric direction is established at a place angularly delayed at a given angle $\theta_1$ from the phantom trunnion axis $O_1$ of the pump swashplate 10 in a direction R of relative rotation of the cylindrical input shaft 5.

When a relative rotation occurs between the cylindrical input shaft 5 and the pump cylinder 7, the first eccentric ring 63 causes each of the first distributor valves 61 to be reciprocally moved in the first valve bore 54 between radially inner and outer positions of the pump cylinder 7 with its stroke being set at a distance as long as two times the amount of eccentricity $\epsilon_1$.

In FIG. 6, the discharge region of the hydraulic pump P is designated by D, while the suction region is by S. In the discharge region D, the first distributor valve 61 is moving on the side of the radially inner position from a position $N_1$ (which will hereinafter be referred to as an eccentricity neutral position) that is normal to the line $X_1$, thereby bringing the corresponding pump port a into communication with the outer oil passage 53 and out of communication with the inner oil passage 52. As a result, the pump plunger 9 which is in a discharge stroke causes working oil to be discharged from the cylinder bore 8 into the outer oil passage 53.

In the suction region S, the first distributor valve 61 is moving on the side of the radially outer position with respect to the neutral position $N_1$ thereby to place the corresponding pump port a in communication with the inner oil passage 52 and out of communication with the outer oil passage 53. With this, the pump plunger 9 in the suction stroke causes working oil to be sucked from the inner oil passage 52 into the cylinder bore 8.

Figure 6A:
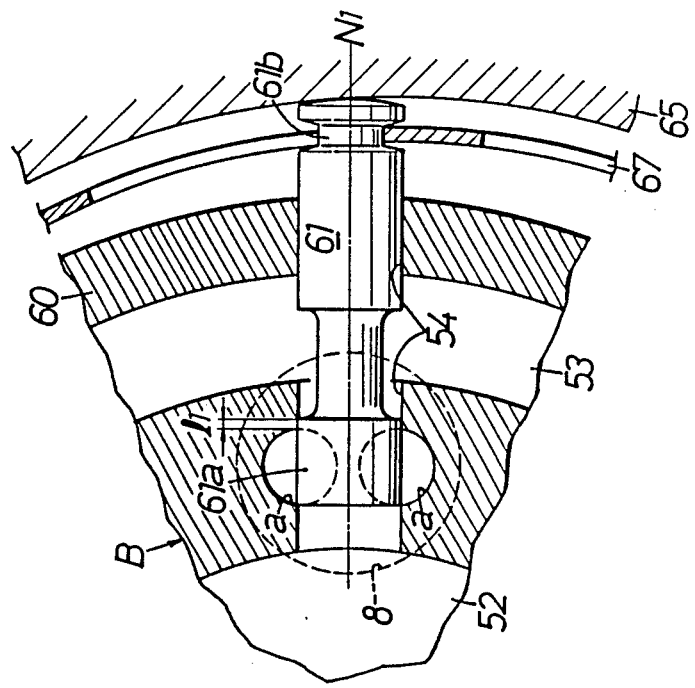
FIG. 6A is an enlarged sectional view of a first distributor valve brought into an eccentricity neutral position in FIG. 6 and a portion around the first distributor valve.

In the eccentricity neutral position $N_1$, the first distributor valve 61 puts the corresponding pump port a out of communication with both the oil passages 52 and 53. In this case, a valve-closing margin $l_1$ is provided on a land 61a of the first distributor valve 61, which serves to close the port a, only at its portion closer to the outer oil passage 53, as shown in FIG. 6A.

In this way, the discharge region D of the hydraulic pump P is angularly delayed by the angle $\theta_1$ as compared with the case where the line $X_1$ in the eccentric direction is aligned with the phantom trunnion axis $O_1$, and the suction region S is set to have an angle larger than that of the discharge region D.

Figure 8:
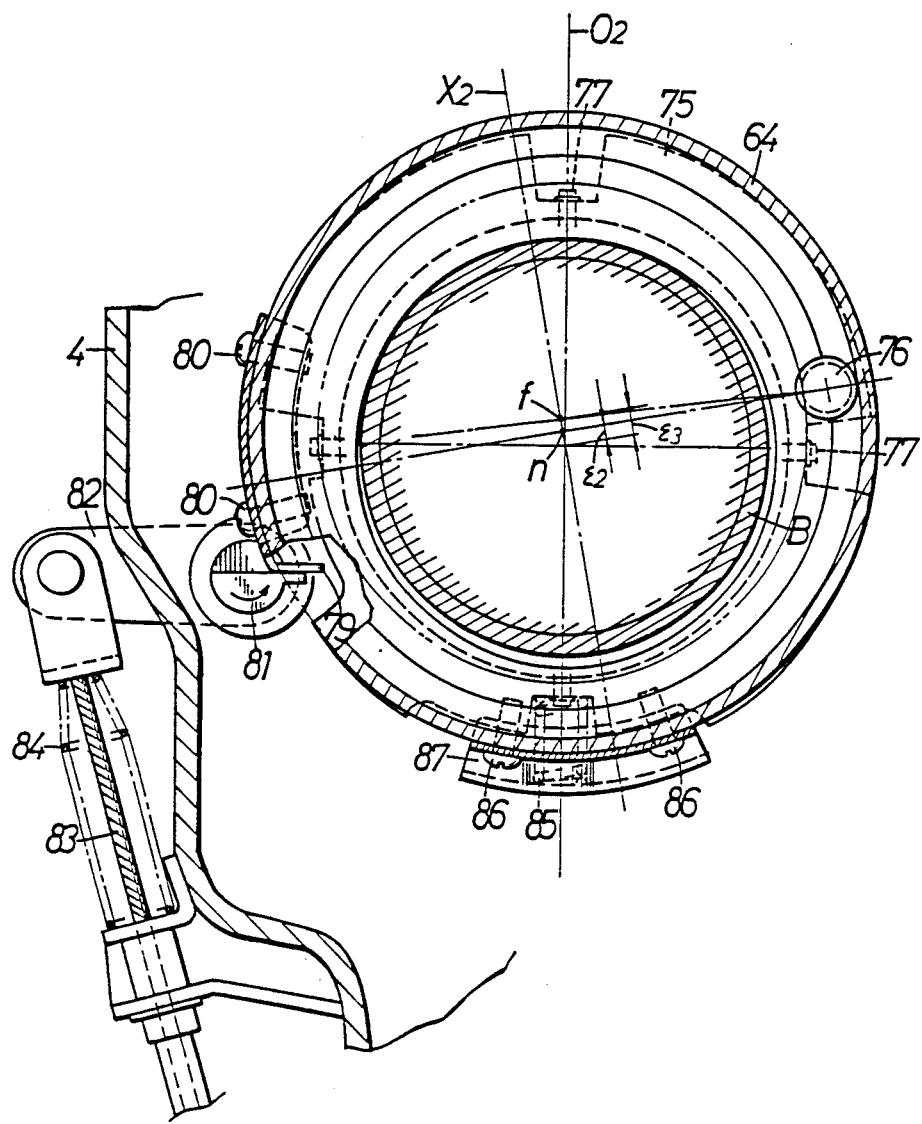

The second eccentric ring 64 is connected to the cylinder holder 24 through a pivot 76 parallel to the input shaft 2 for swinging movement between a clutch ON position n and clutch OFF position f, as shown in FIGS. 1, 2 and 8.

A line $X_2$ in an eccentric direction of the second eccentric ring 64 is set at a place angularly advanced through a given angle $\theta_2$ from the trunnion axis $O_2$ in the direction R of rotation of the motor cylinder 17, and its amount of eccentricity will be $\epsilon_2$ in the clutch ON position n and $\epsilon_3$ larger than $\epsilon_2$ in the clutch OFF position f.

When the second eccentric ring 64 assumes the clutch ON position n, the eccentric ring 64, upon rotation of the motor cylinder 17, causes each of the second distributor valves 62 to be reciprocally moved in the second valve bore 55 between radially inner and outer positions of the motor cylinder 17 with its stroke being set at a distance two times the amount of eccentricity $\epsilon_2$.

Figure 9A:
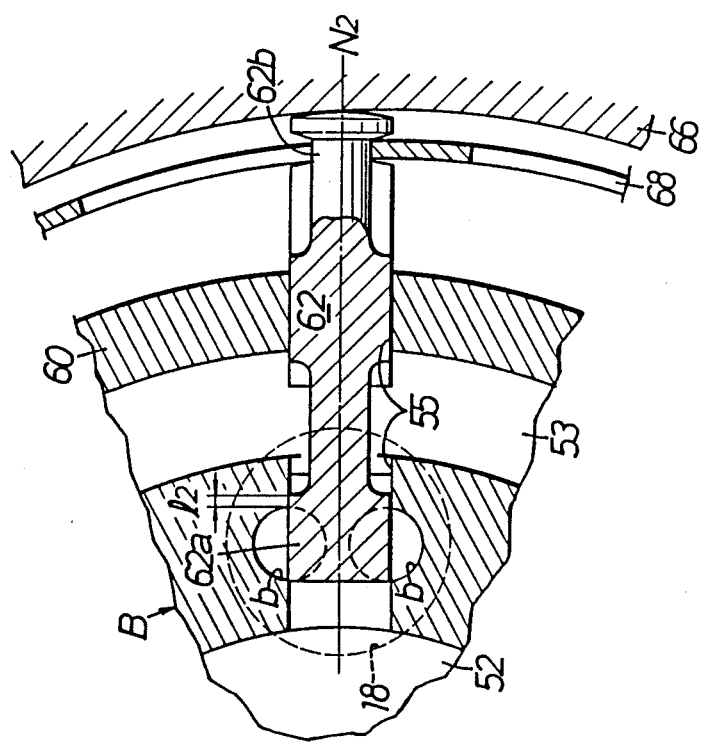
FIG. 9A is an enlarged sectional view of a second distributor valve brought into an eccentricity neutral position in FIG. 9 and a portion around the second distributor valve.
Figure 9:
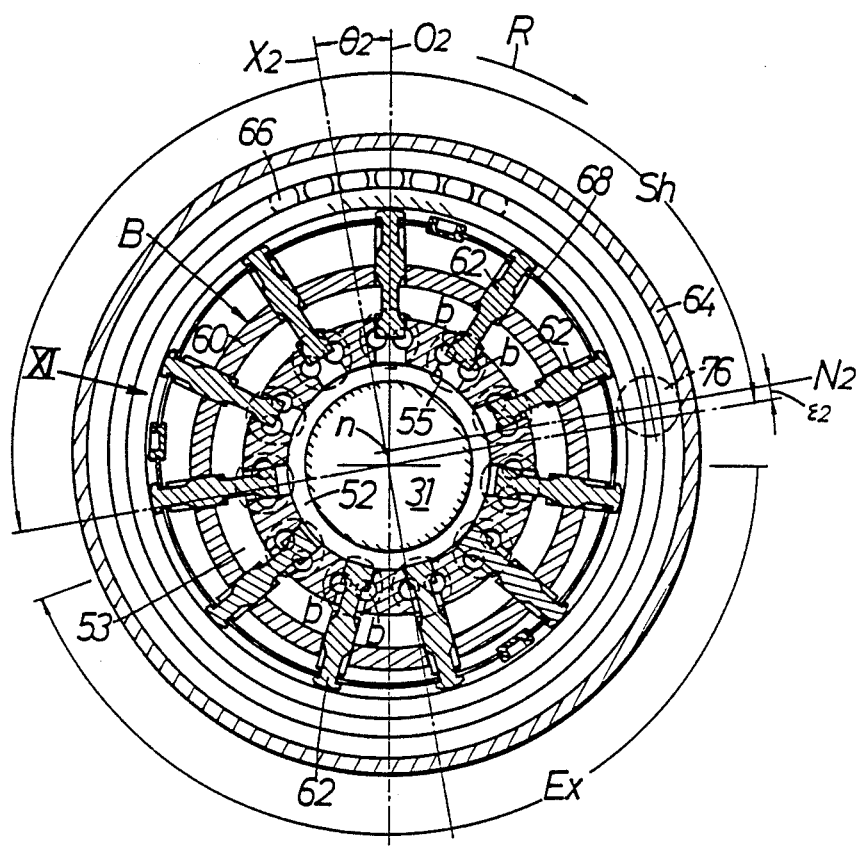
Figure 10:
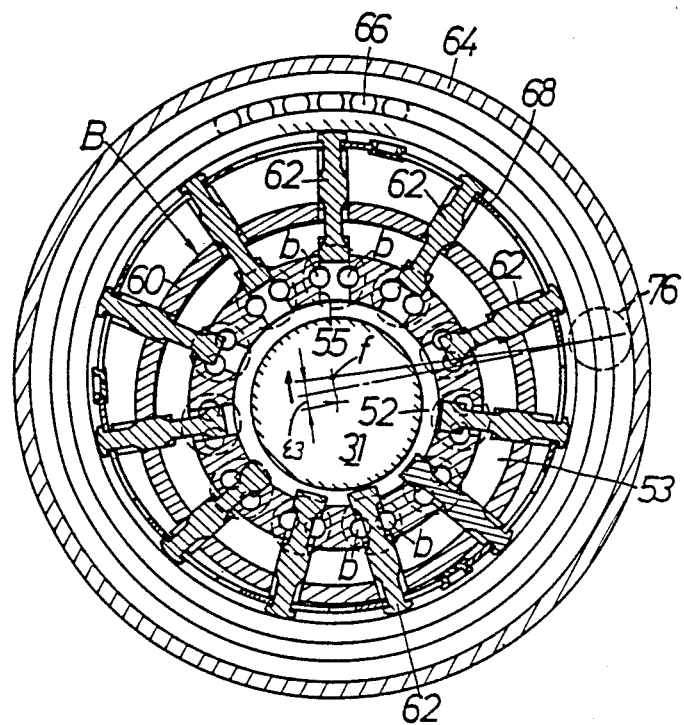

In FIG. 9, an expansion region of the hydraulic motor M is designated by Ex, while a shrinkage region thereof is by Sh. In the expansion region Ex, the second distributor valve 62 is moving on the side of the radially inner position from an eccentricity neutral position $N_2$ thereby to bring the corresponding motor port b into communication with the outer oil passage 53, while at the same time putting the port out of communication with the inner oil passage 52, so that a higher pressure working oil is supplied from the outer oil passage 53 into the cylinder bore 18 of the motor plunger 19 which is in an expansion stroke.

In the shrinkage region Sh, the second distributor valve 62 is moving on the side of the radially outer position with respect to the eccentricity neutral position $N_2$ to bring the corresponding motor port b into communication with the inner oil passage 52, while at the same time putting it out of communication with the outer oil passage 53, so that the working oil is discharged out of the cylinder bore 18 of the motor plunger 19 in a shrinkage stroke into the inner oil passage 52.

In the eccentricity neutral position $N_2$, the second distributor valve 62 puts the corresponding port b out of communication with both of the oil passages 52 and 53. In this case, a given valve-closing margin $l_2$ is provided on a land 62a of the first distributor valve 62, which serves to close the port b, only at its portion closer to the outer oil passage 53, as shown in FIG. 9A.

In this way, the expansion region Ex of the hydraulic motor M is angularly advanced by the angle $\theta_2$ as compared with the case where the line $X_2$ in the eccentric direction is aligned with the trunnion axis $O_2$, and the shrinkage region Sh is set to have an angle larger than that of the expansion region Ex.

When the second eccentric ring 64 assumes the clutch OFF position f, it causes each of the second distributor valves 62 upon rotation of the motor cylinder 17 to be reciprocally moved in the second valve bore 55 between the radially inner and outer positions of the motor cylinder 17 with its stroke being set as long as two times the eccentric amount $\epsilon_3$. In the inner and outer positions, the second distributor valve 62 permits the outer oil passage 53 to be opened outside the cylinder block B.

A pair of the aforesaid pump ports a are provided per cylinder bore 8 side by side in a direction perpendicular to the direction of sliding movement of the first distributor valve 61. A pair of the aforesaid motor ports b are also provided per cylinder bore 18 side by side in a direction perpendicular to the direction of sliding movement of the second distributor valve 62. By doing so, each distributor valve 61, 62 enables opening and closing of the corresponding port a, b to be achieved with a relatively short stroke thereof, while insuring a larger total passage area for the pump ports a and the motor ports b.

Returning to FIG. 8, an abutment plate 79 is secured to the second eccentric ring 64 at its peripheral wall located on the opposite side from the pivot 76 by a machine screw 80, and a cam shaft 81 pivoted on the casing C and is mounted in engagement with the abutment plate 79 so as to urge the latter toward the clutch OFF position f of the second eccentric ring 64. An operating wire 83 is connected to a clutch lever 82 secured to an outer end of the cam shaft 81, and a spring 84 for returning the clutch lever 82 is mounted in compression between the clutch lever 82 and the casing C. The second eccentric ring 64 is also biased by a set spring 85 toward the clutch ON position n. The set spring 85 is mounted in compression between a retainer 87 secured to the outer periphery of the second eccentric ring 64 by a machine screw 86 and the support ring 75. Here, the cam shaft 81 and set spring 85 together form a drive mode changing means capable of changing the mode of drive of the second eccentric ring 64 with respect to the second distributor valves 62, 62 . . .

Thus, the second eccentric ring 64 is normally held at the clutch ON position n by the force of set spring 85, but it is swung to the clutch OFF position f as the cam shaft 81 is turned in the direction indicated by an arrow by drawing the operating wire 83.

With the above construction, when the cylindrical input shaft 5 of the hydraulic pump P is rotated by the input shaft 2 with the second eccentric ring 64 remaining held at the clutch ON poisiton n, the pump swashpalte 10 causes the discharge and suction strokes to be alternately provided to the pump plungers 9, 9 . . .

Thus, the pump plunger 9 feeds a working oil from the cylinder bore 8 into the outer oil passage 53 under pressure when it is passing through the discharge region D, and it draws the working oil from the inner oil passage 52 into the cylinder bore 8 when it is passing through the suction region S.

The high pressure working oil fed to the outer oil passage 53 is supplied into the cylinder bore 18 of the motor plunger 19 located in the expansion region Ex of the hydraulic motor M, on the one hand and is discharged from the cylinder bore 18 into the inner oil passage 52 by the motor plunger 19 located in the shrinkage region Sh, on the other hand.

During this operation, the cylinder block B is rotated by the sum of a reaction torque received by the pump cylinder 7 from the pump swashplate 10 through the pump plungers 9 which are in the discharge stroke and a reaction torque received by the motor cylinder 17 from the motor swashplate 20 through the motor plungers 19 which are in the expansion stroke, and the rotational torque of the cylinder block B is transmitted from the output gear 3 to the differential device Df.

The specific arrangement that the pump cylinder 7 and the motor cylinder 17 are disposed coaxially with respect to each other enables the motor cylinder 17 to have a relatively small diameter like the pump cylinder 7. Moreover, the motor cylinder 17 has on its outer periphery no obstructing components such as the cylindrical input shaft 5. Accordingly, the output gear 3 provided on the outer peripheral surface of the motor cylinder 17 can have a relatively small diameter and therefore allows the differential device Df to be driven at a sufficiently reduced speed.

In this case, the shift ratio of the output gear 3 to the cylindrical input shaft 5 is given by the following equation:

$$\text{Shift ratio} = 1 + \frac{\text{Capacity of the hydraulic motor } M}{\text{Capacity of the hydraulic pump } P}$$

Therefore, if the capacity of the hydraulic motor M is changed from 0 to a certain value, the shift ratio can be changed from 1 to a certain required value. Because the capacity of the hydraulic motor M is determined by the stroke of the motor plunger 19, the shift ratio can be controlled in a continuously variable manner from 1 to a certain value by moving the motor swashplate 20 between the standing position and a certain tilted position.

Since the suction region S is set at an angle larger than that of the discharge region D in the hydraulic pump P, the suction efficiency into the cylinder bore 8 can be effectively increased even if the back pressure of the pump plunger 9 which is in the suction stroke is far lower than that of the pump plunger 9 which is in the discharge stroke. Consequently, the entire efficiency of the hydraulic pump P can be improved even if the discharge region D is somewhat sacrificed.

It should be understood that to enhance such efficiency to the utmost, it is most desirable to set the suction region S at an angle of 180°.

In addition, since the discharge region D is angularly delayed by the angle $\theta_1$ as compared with the case where the line $X_1$ in the eccentric direction of the first eccentric ring 63 is aligned with the phantom trunnion axis $O_1$, the pump plunger 9 receives a large compression load from the pump swashplate 10 from the instant when it has been shrinked a certain amount after having passed its most projected point. As a result, maximum bending moment which may be produced in the pump plunger 9 is reduced, so that a gouging phenomenon occurring between the pump plunger 9 and the opened edge of the cylinder bore 8 is moderated and thus, a frictional loss due to such phenomenon is significantly reduced.

On the other hand, since the shrinkage region Sh is set at an angle larger than that of the expansion region Ex in the hydraulic motor M, the back pressure of the motor plunger 19 which is in a shrinkage stroke can be reduced sufficiently, and the efficiency of the hydraulic motor M can be totally improved even if the expansion region Ex is somewhat sacrificed.

It should be understood that to enhance such efficiency to the utmost, it is most desirable to set the shrinkage region Sh at an angle of 180°.

Additionally, since the expansion region Ex is angularly advanced by the angle $\theta_2$ as compared with the case where the line $X_2$ in the eccentric direction of the second eccentric ring 64 is aligned with the trunnion axis $O_2$, the motor plunger 19 which is in an expansion stroke is released from a thrust reaction of the motor swashplate 20 before reaching its most projected point. As a result, maximum bending moment which may be produced in the motor plunger 19 is reduced, so that a gouging phenomenon occurring between the motor plunger 19 and the opened edge of the cylinder bore 18 is moderated and thus, a frictional loss due to such phenomenon is reduced significantly.

During such operation, if the second eccentric ring 64 is swung to the clutch OFF position f, the second distributor valve 62 permits the outer oil passage 53, which is subjected to a high pressure, to be opened to the outside of the cylinder block B, so that the high pressure working oil is not supplied to the hydraulic motor M. Thus transmission of a power is cut off between the hydraulic pump P and the hydraulic motor M. In other words, a socalled clutch OFF condition is provided.

During operation of both the hydraulic pump P and the hydraulic motor M, the pump swashplate 10 receives a thrust load from the pump plungers 9, 9 . . . , while the motor swashplate 20 receives a thrust load from the motor plungers 19, 19 . . . , these thrust loads acting in the opposite directions. However, the thrust load received by the pump swashplate 10 is received and supported by the input shaft 2 through the thrust roller bearing 11, pump swashplate holder 12, drive gear 39 and the cotter 36, while the thrust load received by the motor swashplate 20 is likewise received and supported by the input shaft 2 through the thrust roller bearing 21, trunnion shaft 22, swashplate anchor 23, thrust roller bearing 47, support sleeve 45 and the cotter 44. Therefore, such thrust loads merely produce a tensile stress within the input shaft 2 and would not at all act on the casing C supporting the shaft 2.

Figure 7:
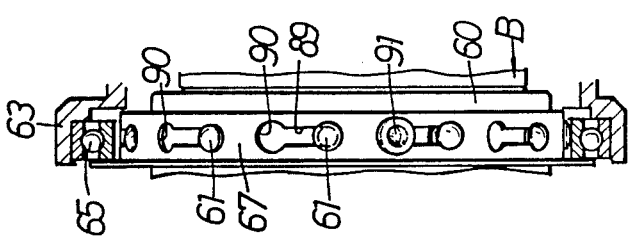

The connecting arrangement for the first distributor valves 61 and the forcing ring 67 comprises, as shown in FIGS. 6 and 7, a smaller diameter neck 61b formed on each distributor valve 61 and circumferentially elongated holes 89 made in the forcing ring 67 and adapted to be engaged by each neck 61b. A larger diameter hole 90 is connected to one end of each elongated hole 89, so that a larger diameter outer end portion of the distributor valve 61 may be inserted through the larger diameter hole 90. Thus, if the distributor valve 61 is inserted into the larger diameter hole 90 with the neck 61b thereof being mated in the elongated hole 89 and then, the forcing ring 67 is rotated circumferentially, the neck 61b can be engaged in the elongated hole 89. To maintain this engagement, a resilient plug 91 is fitted in at least one of the larger diameter holes 90.

The connecting arrangement for the second distributor valves 62 and the forcing ring 68 is similar to the connecting arrangement for the first distributor valves 61 and the forcing ring 67, as shown in FIGS. 11 and 12 and hence, the corresponding parts are designated by the same reference numerals and characters and detailed description thereof will be omitted.

Figure 15:
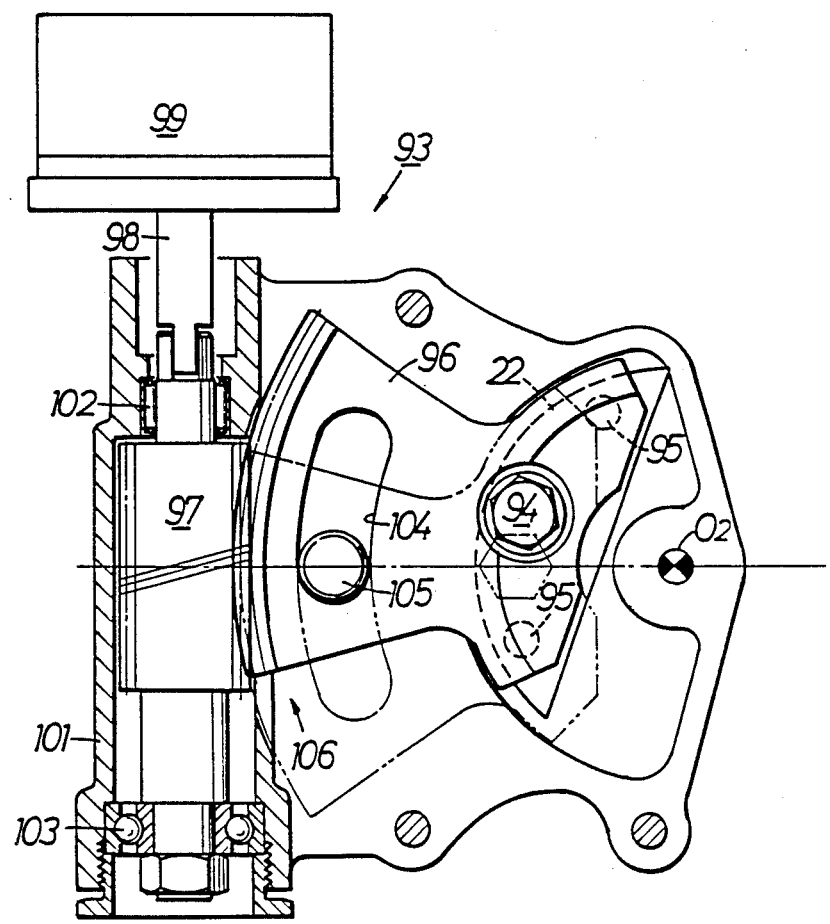

Referring to FIGS. 1, 2 and 15, a shift control device 93 for controlling the tilting angle of the motor swashplate 20 is connected to the trunnion shaft 22. The shift control device 93 comprises a sector gear 96 secured to the other end of the trunnion shaft 22 by a bolt 94 and a pair of nock pins 95, a worm gear 97 meshed with the sector gear 96, and a reversible D.C. electric motor 99 having a drive shaft 98 thereof connected to the worm gear 97. The worm gear 97 is rotatably supported through bearings 102 and 103 on a gear box 101 which is secured to the casing C by a bolt 100. The electric motor 99 has a stator fixed to an appropriate place on the casing C.

Thus, the sector gear 96 and the worm gear 97 constitute a decelerator 106 which can decelerate and transmit the rotation of the drive shaft 98 to the trunnion shaft 22, but can be brought into a locked state upon reception of a reverse load from the trunnion shaft 22.

If the electric motor 99 is rotated in a normal or reverse direction, the rotation thereof can be transmitted in a decelerated manner from the worm gear 97 to the sector gear 96 and further can be transmitted to the trunnion shaft 22 to rotate the latter in a standing or tilted-down direction.

When operation of the electric motor 99 has been stopped to maintain the motor swashplate 20 at any desired angle, both the gears 96 and 97 assume their respective locked states to inhibit the rotation of the trunnion shaft 22 and therefore, the motor swashplate 20 is reliably held in its current position, because the worm gear 97 cannot be driven by the sector gear 96 even if the motor swashplate 20 receives a standing or tilting-down moment from the motor plungers 19, 19 . . . and this moment is transmitted through the trunnion shaft 22 to the sector gear 96.

In order to restrict the standing and tilted-down positions of the motor swashplate 20 provided by the electric motor 99, an arcuate restricting groove 104 concentric with the sector gear 96 is formed in the sector gear 96, and a stopper pin 105 adapted to slidably engage the restricting groove 104 is secured to the gear box 101.

Referring again to FIGS. 1 and 2, a main blind oil passage 108 is provided at a central portion of the input shaft 2, and an oil filter 109 is mounted in the main oil passage 108 over the almost entire length thereof.

The opened end of the main oil passage 108 is connected through a supplement pump 38 to an oil reservoir 110 provided at the bottom of the casing C. The supplement pump 38 is driven by the drive gear 39. Thus, during rotation of the cylindrical input shaft 5, an oil within the oil reservoir 110 is constantly supplied into the oil passage 108 by the supplement pump 38.

This oil is first filtered by the oil filter 109 and is then passed through radial supplement holes or passages 111 perforated in the input shaft 2 into the inner oil passage 52. Thus, any leakage of the working oil occurring at the hydraulic closed circuit between the hydraulic pump P and the hydraulic motor M may be supplemented.

First check valves 112 for blocking the reverse flow of oil from the inner oil passage 52 are mounted in each supplement hole 111 and are biased in their closing direction by a leaf spring 114 mounted to surround the input shaft 2.

During reverse load operation, i.e., during engine-brake operation, the hydraulic motor M operates to provide a pumping action, and the hydraulic pump P operates to provide a motor action. Therefore, the pressure in the outer oil passage 53 is changed to a lower level and the pressure in the inner oil passage 52 is changed to a higher level, so that the working oil is intended to reversely flow out of the inner oil passage 52 into the supplement hole 111, but such reverse flow is blocked by the first check valve 112. In this manner, a reverse load is reliably transmitted from the hydraulic motor M to the hydraulic pump P, thus providing a good engine brake effect.

FIGS. 18-22 show a second embodiment. Hereinafter, description will mainly be made of portions of this embodiment that are different from the first embodiment.

Figure 22:
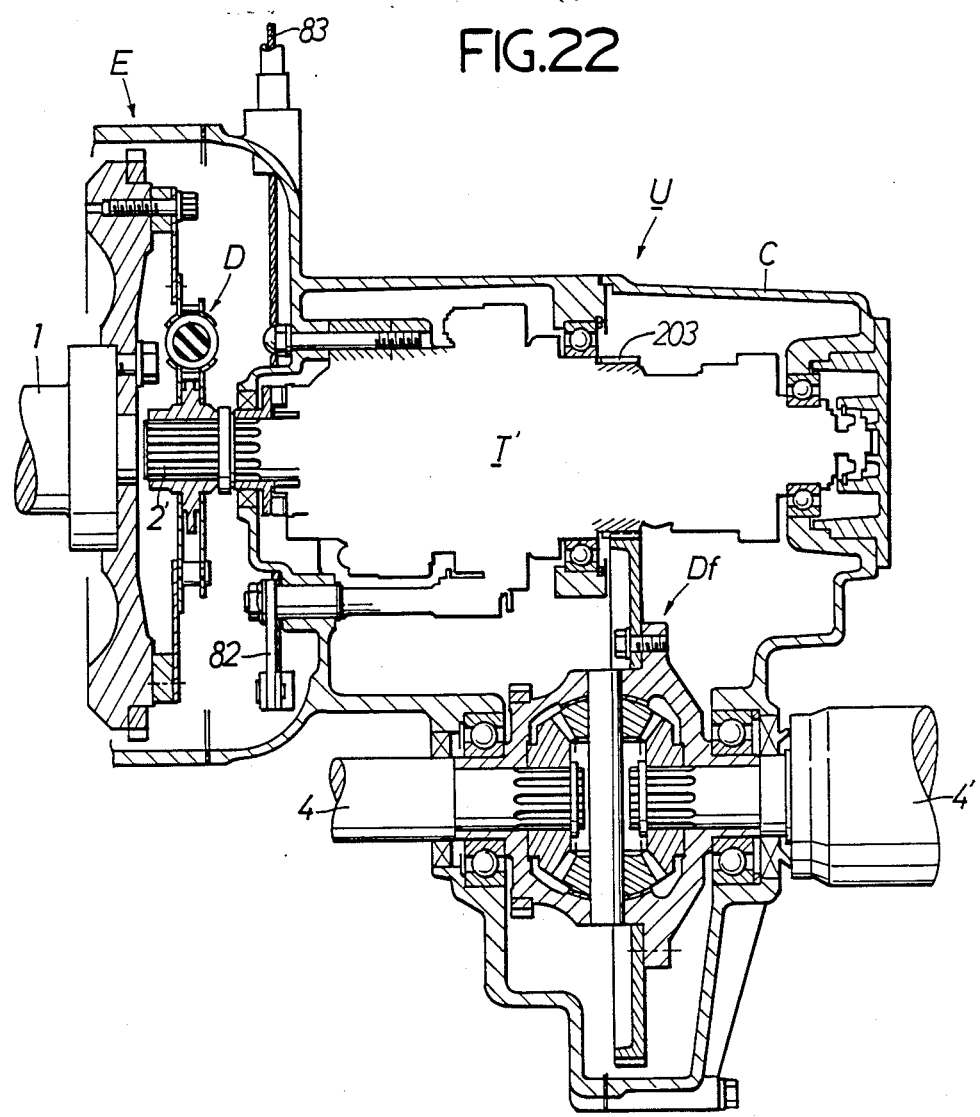

As shown in FIG. 22, a hydrostatic continuously variable transmission T' according to this embodiment has an output gear 203 located at a position remote from the engine E as compared with the first embodiment, the gear 203 being meshed with a ring gear of the differential device Df. More specifically, in this embodiment, the cylindrical input shaft 5 of the first embodiment has been omitted here and the output gear 203 is provided at the right end on the outer periphery of the pump cylinder 7 of the hydraulic pump P. The pump cylinder 7 is carried on the input shaft 2' via needle bearing 13 at a position substantially corresponding to the output gear 203 as seen in the axial direction of the input shaft 2', so that any drive reaction the output gear 203 receives from the differential device Df can be reliably supported by the needle bearing 13, thereby suppressing any inclination of the cylinder block B which may otherwise be caused by such driving reaction.

A drive gear 239 for driving the supplement pump 38 is spline-connected to the right end on the outer periphery of the input shaft 2' in a manner interposed between the pump swashplate holder 12 and the split cotter 36.

In this embodiment, the first valve driving means for giving reciprocating motion to the first distributor valves is not provided around the outer periphery of the cylinder block. Namely, an eccentric shaft 263 is instead formed as the first valve driving means on an axially intermediate portion of the input shaft 2' in an integral manner and against this eccentric shaft 263 are abutted the radially inner ends of first distributor valves 261, 261 ... which surround the shaft 263. In order to force their abutting engagement, a forcing ring 267 is provided concentrically with the eccentric shaft 263 and is engaged with the radial outer ends of the first distributor valves 261, 261 ... The first distributor valves 261, 261 ... are designed to be relatively long as compared with the valves 61, 61 ... according to the first embodiment in order to ensure their engagement with the eccentric shaft 263.

On the other hand, the second distributor valves 62, 62 ... have their radially outer ends placed in engagement with the surrounding eccentric ring 64 as the second valve driving means via ball bearing 66, like the first embodiment. Their engagement is forced by the forcing ring 68 which is disposed concentric with the eccentric ring 64 and interconnects the outer ends of the second distributor valves 62, 62 ...

Figure 20:
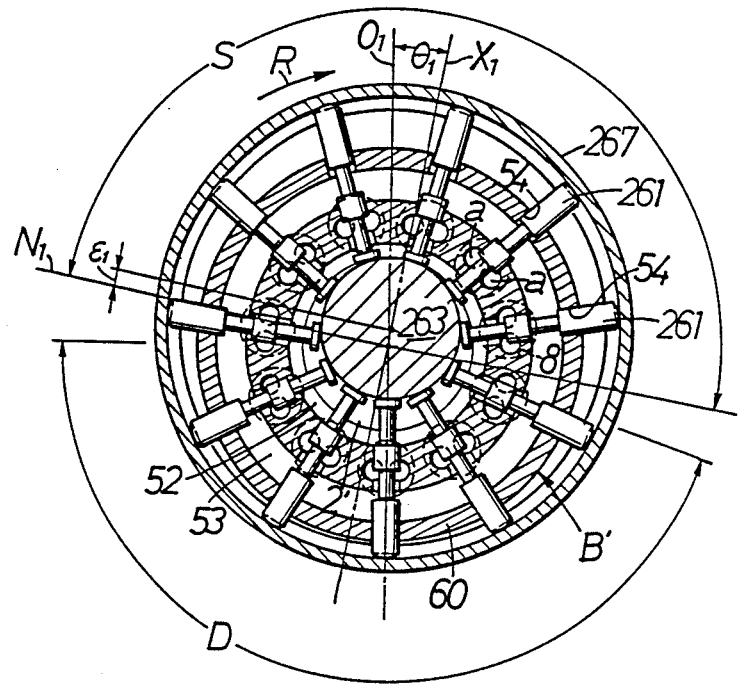
Figure 21:
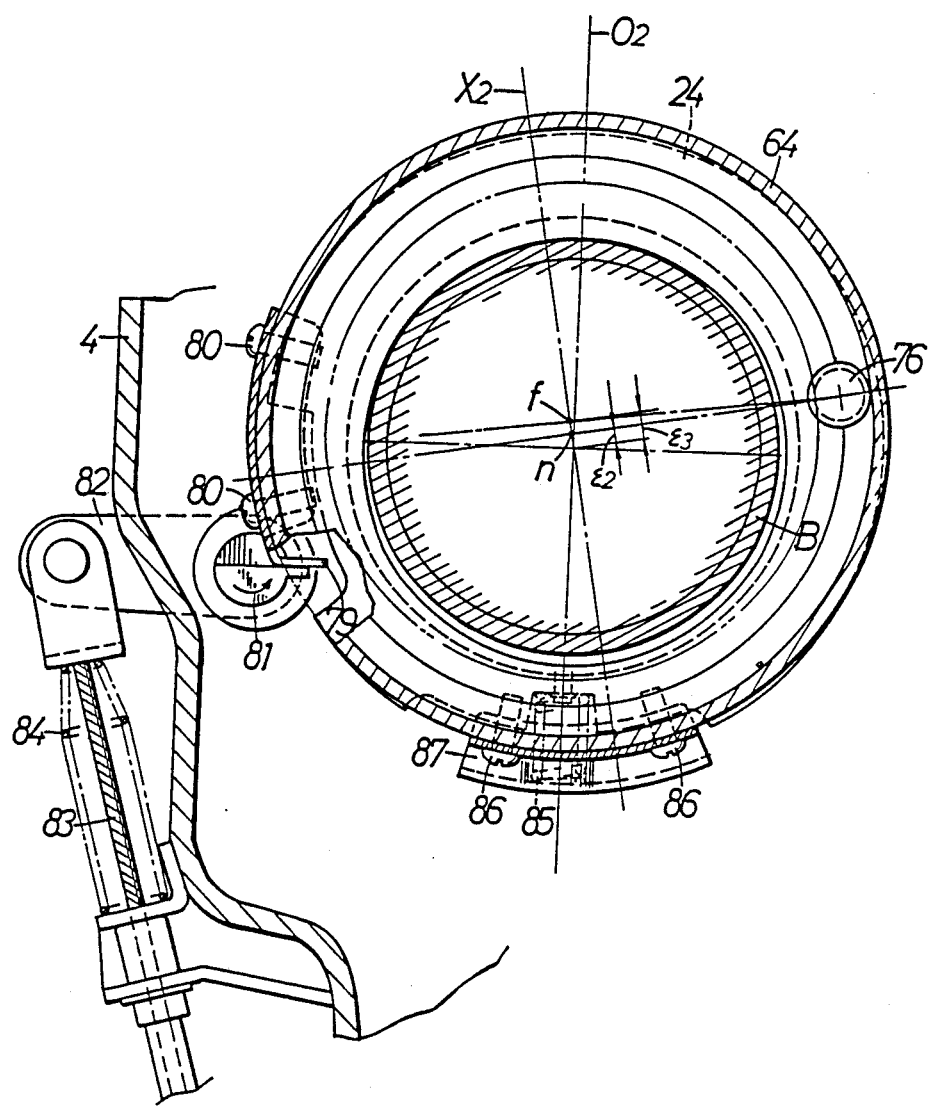

As shown in FIG. 20, the eccentric shaft 263 assumes a position offset a predetermined distance $\epsilon_1$ from the center of the input shaft 2' along the line $X_1$ in the eccentric direction. The line $X_1$ in the eccentric direction has been set at a position delayed by the given angle $\theta_1$ in the rotating direction R of the input shaft 2' with respect to the phantom trunnion axis $O_1$ of the pump swashplate 10.

Owing to this arrangement, when relative rotation occurs between the input shaft 2' and the pump cylinder 7, each first distributor valve 261 is caused by the eccentric shaft 263 to reciprocally move in the first valve bore 52 between radially inner and outer positions of the pump cylinder 7 with its stroke being set at a distance as long as two times the amount of eccentricity $\epsilon_1$.

The cylinder block B' is rotatably supported on the casing C via ball bearing 206 at a position rightward of the forcing ring 267.

A radially extending supplement hole or passage 311 is provided in the input shaft 2' for connection between the inner oil passage 52 and the main oil passage 108. At connected portions between the supplement hole 311 and the main oil passage 108 there are disposed check valves 312 adapted to block the reverse flow of oil from the inner oil passage 52. Oil fed from the supplement pump 38 is filtered by an oil filter 309 and is then supplied into the main oil passage 108.

Accordingly, in case of this second embodiment, a concentrated arrangement of the first and second valve driving means is avoided, which may contribute to a reduced size of the transmission and an increase in freedom of design of the respective valve driving means.

It should be noted that throughout the foregoing embodiments the transmission shaft is embodied into the input shaft 2, 2' serving as an input section and the output gear 3, 3' serves as an output section formed on the cylinder block B, B' as the transmission member, however, at the time of engine brake operation the gear 3, 3' serves as an input section and the input shaft 2, 2' serves as an output section. It should further be apparent that the illustrated arrangement can be modified so as to allow the gear 3, 3' to act as an input gear and the shaft 2, 2' to act as an output shaft even in a normal load operation.

We claim:

1. A hydrostatic continuously variable transmission comprising a hydraulic pump having a pump cylinder, a hydraulic motor having a motor cylinder, a hydraulic closed circuit between the hydraulic pump and the hydraulic motor, and a transmission shaft which relatively rotatably supports thereon the pump cylinder and the motor cylinder, wherein a pump swashplate is opposedly arranged at an outer end of the pump cylinder, a motor swashplate is opposedly arranged at an outer end of the motor cylinder, said pump cylinder and said motor cylinder being integrally rotatably connected with each other so as to form a transmission member, one of said pump swashplate and said motor swashplate being formed to be driven synchronously with the transmission shaft, and wherein said transmission shaft is formed as either an input section or an output section of the continuously variable transmission while the other of the input section or output section is integrally formed on an outer periphery of one of the pump cylinder and the motor cylinder.

2. The transmission according to claim 1, wherein the transmission shaft is formed as the input section and the transmission member is formed thereon with the output section.

3. The transmission according to claim 1, wherein the pump cylinder and the motor cylinder are arranged opposedly to each other.

4. The transmission according to claim 1, wherein the pump cylinder and the motor cylinder are arranged opposedly to each other and are integrally formed to constitute a cylinder block, a gear being formed on an outer periphery of the cylinder block as said other of the input and output sections.

5. The transmission according to claim 1, wherein the pump cylinder and the motor cylinder are integrally formed to constitute a cylinder block, a gear being formed on an outer periphery of the cylinder block as said other of the input and output sections.

6. The transmission according to claim 1, wherein said transmission shaft penetrates through the pump cylinder and the motor cylinder and projects from opposite outer sides of these cylinders 7. The transmission according to claim 3, wherein said transmission shaft penetrates through the pump cylinder and the motor cylinder and projects from opposite outer sides of these cylinders.

8. The transmission according to claim 1, wherein a thrust force generated by the hydraulic pump and the hydraulic motor is received and supported by the transmission shaft.

9. The transmission according to claim 6, wherein a thrust force generated by the hydraulic pump and the hydraulic motor is received and supported by the transmission shaft.

10. The transmission according to claim 7, wherein a thrust force generated by the hydraulic pump and the hydraulic motor is received and supported by the transmission shaft.

11. The transmission according to claim 1, wherein the pump cylinder and the motor cylinder are disposed coaxially with respect to each other.

12. The transmission according to claim 5, wherein said gear is disposed concentrically with respect to the transmission shaft and said cylinder block is supported on the transmission shaft via a bearing means at a position substantially corresponding to the gear in an axial direction of the transmission shaft.

13. A hydrostatic continuously variable transmission comprising a hydraulic pump having a pump cylinder, a hydraulic motor having a motor cylinder, and a hydraulic closed circuit between the hydraulic pump and the hydraulic motor, the pump cylinder and the motor cylinder being connected together to form a cylinder block, wherein said hydraulic closed circuit comprises a number of pump cylinder bores arranged annularly in the cylinder block, a number of motor cylinder bores arranged annularly in the cylinder block, an annular inner oil passage and an annular outer oil passage disposed between the pump cylinder bores and the motor cylinder bores, the outer oil passage surrounding the inner oil passage, a number of radially arranged first distributor valves capable of reciprocally moving between radially inner and outer positions of the cylinder block to alternately communicate the respective pump cylinder bores with the inner and outer oil passages, and a number of radially arranged second distributor valves capable of reciprocally moving between radially inner and outer positions of the cylinder block to alternately communicate the respective motor cylinder bores with the inner and outer oil passages, wherein a first valve driving means is provided for driving the first distributor valves and a second valve driving means is provided for driving the second distributor valves, one of the first and second valve driving means being arranged inside the cylinder block and the other being arranged outside the cylinder block.

14. The transmission according to claim 13, wherein a transmission shaft is disposed at a central portion of the cylinder block in a manner relatively rotatable with respect to the block, the transmission shaft being formed to be driven synchronously with the hydraulic pump, an eccentric shaft being formed as the first valve driving means on the transmission shaft and placed in engagement with inner ends of said first distributor valves.

15. The transmission according to claim 13, wherein the second valve driving means is connected with a drive mode changing means which is capable of changing a mode of drive with respect to the second distributor valves.

16. The transmission according to claim 14, wherein the transmission shaft is an input shaft and the cylinder block is formed with an output section.

17. The transmission according to claim 13, wherein a mode of drive of the first valve driving means with respect to the first distributor valves is constant.

18. The transmission according to claim 13, wherein a mode of drive of the first valve driving means with respect to the first distributor valves is constant and the second valve driving means is connected with a drive mode changing means which is capable of changing a mode of drive of the second valve driving means with respect to the second distributor valves.

* * * * *